Aug. 25, 1936.  E. G. ROEHM  2,052,249
MILLING MACHINE
Filed Nov. 5, 1934   5 Sheets-Sheet 2

Inventor
ERWIN G. ROEHM
By A. H. K. Parsons
Attorney

Aug. 25, 1936.  E. G. ROEHM  2,052,249
MILLING MACHINE
Filed Nov. 5, 1934  5 Sheets-Sheet 3

Inventor
ERWIN G. ROEHM
By

Aug. 25, 1936.  E. G. ROEHM  2,052,249
MILLING MACHINE
Filed Nov. 5, 1934   5 Sheets-Sheet 4

Inventor
ERWIN G. ROEHM
By AHKParsons
Attorney

Aug. 25, 1936.  E. G. ROEHM  2,052,249
MILLING MACHINE
Filed Nov. 5, 1934   5 Sheets-Sheet 5

Fig.13

Inventor
ERWIN G. ROEHM

By A. H. Parsons
Attorney

Patented Aug. 25, 1936

2,052,249

UNITED STATES PATENT OFFICE 2,052,249

MILLING MACHINE

Erwin G. Roehm, Norwood, Ohio, assignor to The Cincinnati Milling Machine Company, Cincinnati, Ohio, a corporation of Ohio Application November 5, 1934, Serial No. 751,663

16 Claims. (Cl. 90—16)

This invention relates to machine tools and more particularly to improvements in milling machines.

One of the objects of this invention is to provide improved means in a milling machine for effecting relative movement between the tool and work which may be either an adjusting movement, a feed movement, or a relative quick traverse movement.

Another object of this invention is to provide for power adjustment of the over-arm of a milling machine.

A further object of this invention is to provide a milling machine with an over-arm which may be manually or power adjusted but which will be automatically clamped at all times when not in motion.

An additional object of this invention is to provide automatic means for lubricating the guideways of the over-arm prior to each movement thereof.

A still further object of this invention is to provide in combination with a movable slide of a milling machine of trip operable means for simultaneously stopping the movement of a slide and clamping the same.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts.

Figure 1:
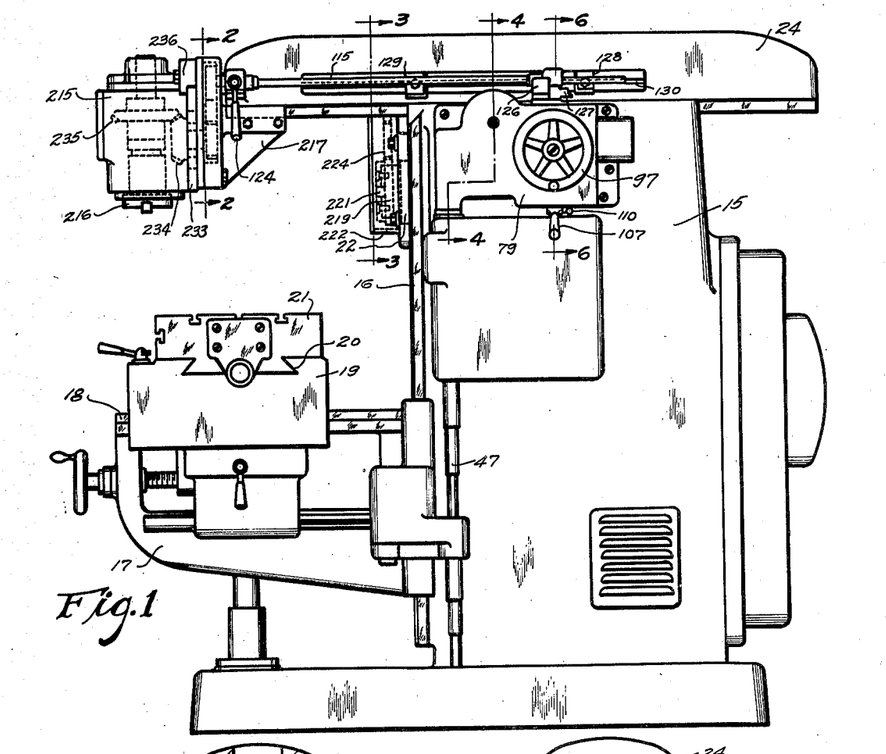
Figure 1 is an elevation of a milling machine embodying the principles of this invention.

In Figure 1 of the drawings the reference numeral 15 indicates the column of a milling machine of the knee and column type, and has guideways 16 formed upon the front face thereof for receiving and guiding a knee 17. The knee has horizontal guideways 18 formed on the upper face thereof for receiving and guiding a saddle 19 for movement toward and from the front face of the column and in turn has guideways 20 for receiving and supporting a work table 21. Machines of this type have a cutter spindle 22, to which an arbor carrying a cutter may be secured for power rotation, and the outboard end of the arbor is usually supported by a pendant 23 which is supported from an over-arm 24 which is longitudinally movable and suitably guided and supported by the column 15.

Figure 13:
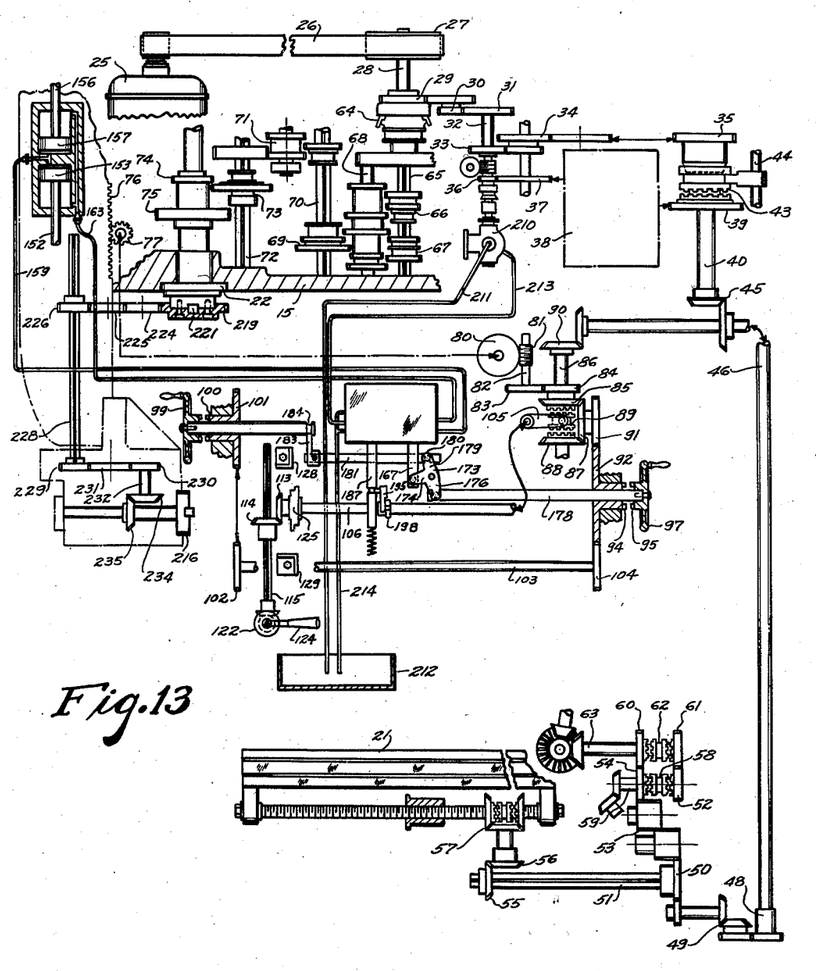
Figure 13 is a semi-diagrammatic view of the entire transmission of the machine.

The knee, saddle and table are power movable and one form of a suitable transmission for this purpose is illustrated in Figure 13. The prime mover 25 is connected by suitable motion transmitting means, such as a chain or belt 26, to a drive pulley 27 secured to the end of shaft 28. This shaft may be suitably journaled in the column of the machine and carries a gear 29 which is connected by intermediate gearing 30 to gear 31 which in turn rotates the main drive shaft 32 of the transmission to the knee, saddle and table.

Shaft 32 has a first gear 33 which is connected by the intermediate train 34 for actuation of gear 35 at a relatively fixed rate and usually termed in the art as a rapid traverse gear.

The shaft 32 has a second gear 36 secured thereto for actuation through gear 37 of a variable feed box 38. Such feed boxes are well known in the art and may include a plurality of shiftable gears which are positionable in various combinations to yield a plurality of feed rates.

The final output of the feed box is connected to gear 39 mounted for free rotation with respect to its supporting shaft 40, which shaft also carries the rapid traverse gear 35 mounted for free rotation thereon. The gears 35 and 39 are selectively connectible to shaft 40 by a clutch member 41 which is splined on shaft 40 and is connectible by friction clutch means 42 to gear 35 or positively connectible by clutch teeth 43 to gear 39. A shaft 44 may be suitably extended and provided with an operating handle for shifting the clutch. The shaft 40 is connected by bevel gearing 45 to a vertical shaft 46 which is inclosed in telescoping tubing 47 as shown in Figure 1 of the drawings. This shaft has a splined connection with a gear 48 which is carried by and movable with the knee of the machine, and which is connected by suitable intermediate gearing 49 to a main drive gear 50.

This gear is fixed for rotation of shaft 51 for effecting actuation of the table and is directly connected to gear 52 for effecting movement of the knee and saddle in one direction and indirectly connected through intermediate idlers 53 to gear 54 for effecting reverse movement of the knee and saddle.

The shaft 51 has a bevel gear 55 splined thereon which is movable with the saddle; and held in engagement therewith is a bevel gear 56 which in turn drives a suitable reversing clutch 57 for the table 21.

The gears 52 and 54 are selectively connectible by an intermediate clutch 58 with a shaft 59 for power moving the saddle toward and from the column. The gears 54 and 52 also mesh with gears 60 and 61 respectively which in turn are selectively connectible by an intermediate clutch 62 to the knee driving shaft 63.

It will thus be seen that the knee, saddle and table may be driven at feed or quick traverse rates dependent upon the position of clutch 41 and in opposite directions dependent upon their respective reverser clutches which are also movable to a neutral position for stopping their respective supports. Since the feed-rapid traverse clutch 41 is not movable to a neutral position, it will be noted that the shaft 46 is continuously rotated whenever the prime mover is actuated.

The cutter spindle 22 is also driven from the shaft 28 but through a start and stop clutch 64 whereby rotation of the spindle will depend upon the position of the clutch. This clutch operatively connects the shaft 28 to the spline shaft 65 which carries the primary shiftable gear couplets 66 and 67 of a variable speed transmission. These gears are selectively engageable with a plurality of gears carried by the shaft 68 which in turn is inter-connectible by a shiftable gear couplet 69 with a spline shaft 70. This spline shaft is connected through a reverser mechanism 71 to the back gear shaft 72, the latter in turn being connectible in different speed ratios by the shiftable gear couplet 73 which may engage either gear 74 or gear 75 fixed to the cutter spindle. From this it will be seen that the spindle may be rotated at a plurality of different speeds by the prime mover, but is selectively connectible with the prime mover so that the cutter spindle may be rotated independently of the movement of the work supporting members.

Figure 14:
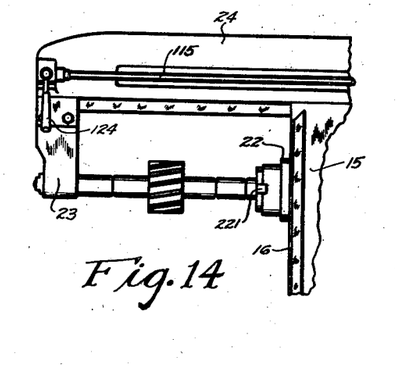
Figure 14 is a detail view showing a cutter arbor attached to the cutter spindle.

When the machine is used as a horizontal type of milling machine, a pendant may be applied to the end of the over-arm 24 as previously suggested, and as more specifically shown in Figure 14. In setting up the machine, it is usually necessary to adjust the over-arm and improved means have been provided for this purpose comprising a mechanism which may be manually or power operated, and in addition a clamping means has been provided which is automatically effective except when the over-arm is being moved.

Figure 4:
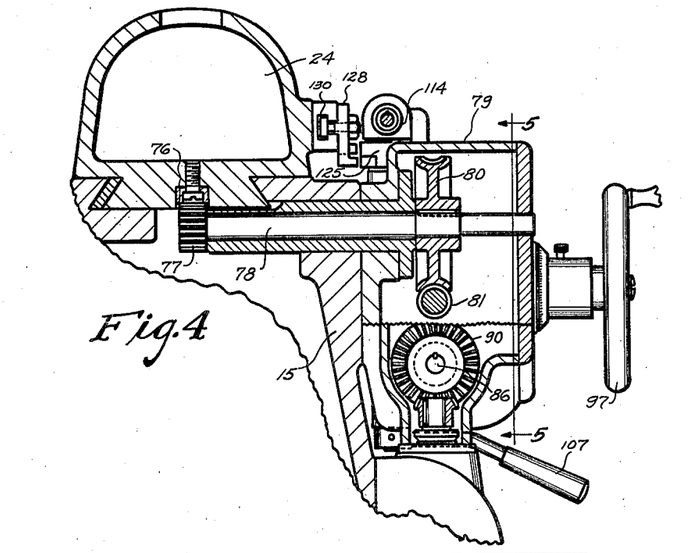
Figure 4 is a section on the line 4—4 of Figure 1.

The mechanism for translating the over-arm comprises a rack 76 which is integral with the over-arm having inter-meshing therewith a pinion 77 which, as shown in Figure 4, is secured to shaft 78. This shaft extends into the gear box 79 attached to the side of the column 15 for receiving a worm gear 80 which is keyed thereto. The worm gear 80 is driven by a worm 81 fast on the shaft 82 which in turn is connected by spur gears 83 and 84 to bevel gear 85. The bevel gear 85 is mounted for free rotation on the shaft 86 and is inter-connected by bevel gear 87 to a second bevel gear 88 which is also mounted on the shaft 86 for free rotation. The gears 85 and 88 have clutch teeth on the opposing faces thereof as shown in Figure 13, which are selectively engageable by clutch teeth on the intervening shiftable clutch member 89 which is splined for rotation by shaft 86. The shaft 86 is continuously driven from the previously described shaft 46 through bevel gearing 90 so that it will be apparent that shaft 86 is continuously rotated by the prime mover 25 and its rate of rotation will depend upon the setting of the feed-rapid traverse clutch 41 and also upon the setting of the gear box 38 when the clutch 41 is in a feed position. This makes it possible to rotate shaft 86 at any one of a plurality of feed rates or at a rapid traverse rate, and dependent upon the position of clutch 90 the overarm may be advanced or retracted at different feed rates or at a quick traverse rate. When the clutch 89 is moved into engagement with the clutch teeth in gear 85, the drive is then directly through gears 84, 83 and worm 81 and worm gear 80. When the clutch 89 is shifted in engagement with the clutch teeth 88 then the drive is through bevel gears 88, 87 and 85 in the order recited, and then through spur gears 84 and 83 to the worm 81.

Figure 5:
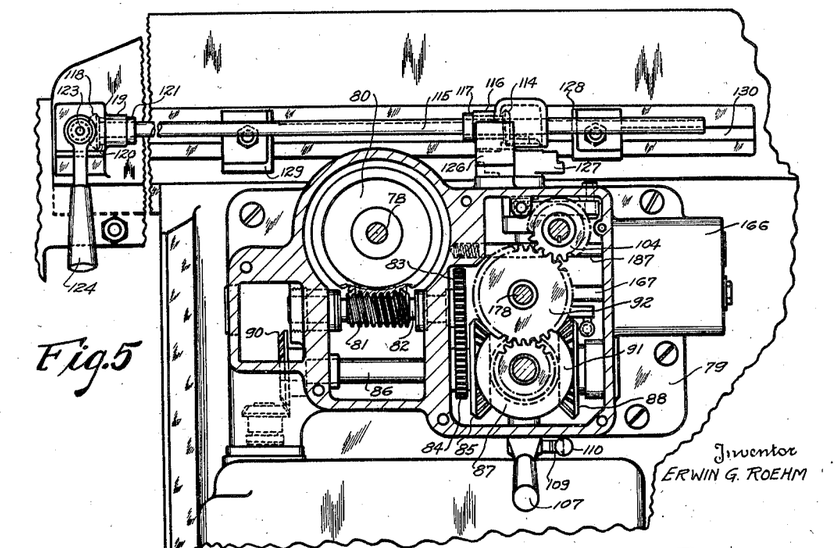
Figure 5 is a section on the line 5—5 of Figure 4 showing the mechanism for translating the over-arm and the controls therefor.
Figure 6:
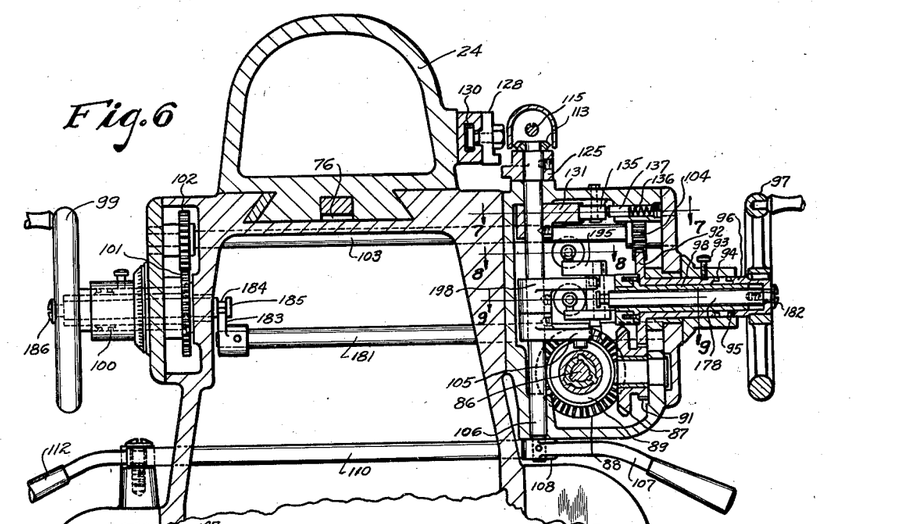
Figure 6 is a section on the line 6—6 of Figure 5 showing the dual manual and power control means for the overarm.

The clutch 89 has a neutral position which means that the bevel gears 85 and 88 are at rest, and advantage is taken of this to provide connections thereto whereby the same may be manually rotated when the clutch 89 is in a neutral position. To this end the gear 87 is provided with an integral spur gear 91 which, as shown in Figures 5, 6 and 13, inter-engages a spur gear 92. As particularly shown in Figure 6, the gear 92 is held in a longitudinally fixed position by a set screw 93 and is provided with clutch teeth 94 on the end of an elongated hub thereof for selective engagement by clutch teeth 95 formed on the end of hub 96 to which is keyed the hand wheel 97. The hub 96 is slidable on the sleeve 98 so that the hand wheel may be moved axially to effect operative engagement with the gear 92.

Figure 10:
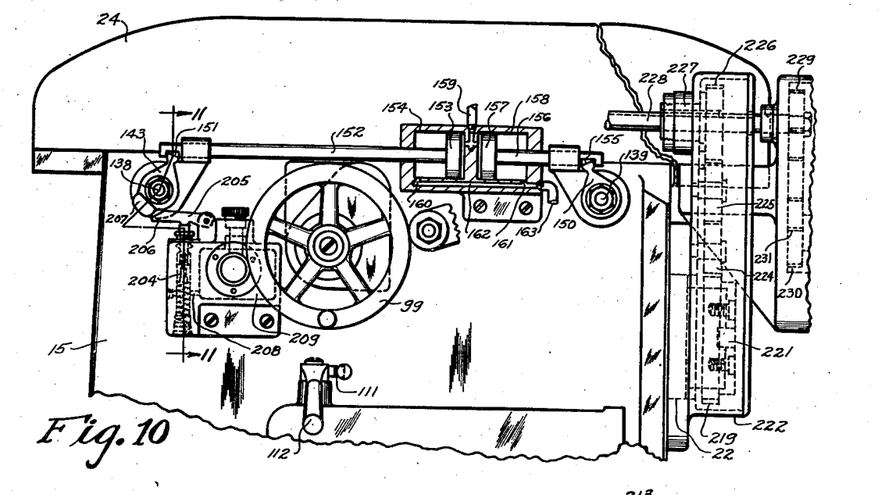
Figure 10 is a partial view of the machine as viewed from the opposite side, as shown in Figure 1.

It will be noted that the hand wheel 97 is in the middle of one side of the column of the machine as shown in Figure 1, and since the operator may be on the opposite side of the machine when he wishes to adjust the over-arm, an additional hand wheel 99 is provided on the opposite side of the machine as shown in Figures 6 and 10, and selectively engageable in the same manner as hand wheel 97 to the hub 100 of spur gear 101. This spur gear as shown in Figure 6 intermeshes with gear 102 fixed to shaft 103 which extends across the column of the machine and connected by spur gear 104 to the gear 92. It will now be seen that the bevel gear 87 may be selectively, manually rotated from two different operating stations of the machine.

The clutch 89 is moved by a shifter arm 105 which is fixed to a rotatable shaft 106, which shaft as shown in Figure 6, has an operating handle 107 fixed to the lower end thereof. The hub 108 of the arm 107 has a tooth-and-slot connection 109 with a shifter rod 110 which extends across the column of the machine and is inter-connected at the other end by a similar tooth and slot connection 111 with a manually operable handle 112. It is thus possible to manually control the position of clutch 89 from either side of the machine and thereby power movement of the over-arm. In many cases however the operator may be at the front of the machine, that is, to the left of the machine as shown in Figure 1, at the time it is desired to adjust the over-arm. Means have been provided whereby he may also control the position of clutch 89 from such an operating position, and to that end the shaft 106 is provided with a bevel gear 113 on the upper end thereof as shown in Figure 6 which engages a bevel gear 114 having a splined bore through which can slide an operating shaft 115. The bevel gear is held against longitudinal movement in a housing 116 by a collar 117 secured to the projecting end of the hub of the gear. The housing 114 is integral with the gear box 79 and therefore not movable. The shaft 115 is secured to the forward end of the overarm for movement therewith by means of a bevel gear 118 which is fixed against movement in a lug 119 projecting from the over-arm by means of a shoulder 120 and a collar 121. The gear 118 meshes with a bevel gear 122 secured to a shaft 123 which has an operating handle 124 secured to the end thereof.

In addition to manually controlling the clutch from three different operating positions, the same may be trip operated to a neutral position by means of a trip lever 125 having a pair of arms 126 and 127 which are movable respectively into the pair of dogs 128 and 129 carried in T-slots 130 formed on the side of the over-arm. For instance, when the shaft 106 is manually rotated to a position to cause advancing movement of the over-arm, the arm 126 will be projected into the path of dog 128 so that if the over-arm has moved to effect engagement of the dog 128 with the arm 126 the clutch 89 will be shifted to stop the movement. Also, upon rotation of the shaft 106 in a counter-clockwise direction as viewed in plan, the arm 127 will be projected into the path of dog 129.

Figure 7:
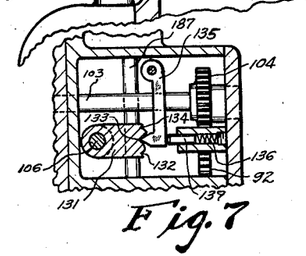
Figure 7 is a detail section of the detent mechanism as viewed on the line 7—7 of Figure 6.

To insure that the clutch is held in its various positions, a detent mechanism is provided as more particularly shown in Figure 7, and comprises an arm 131 which is keyed to shaft 106 and provided with three indents 132, 133 and 134 which are selectively engageable by the spring pressed detent lever 135. A spring 136 acting through a plunger 137 supplies the necessary pressure to maintain engagement of the detent 135 and of the arm 131. This mechanism also acts to insure complete firing of the clutch to a neutral position.

As previously suggested, it is contemplated by this invention that the overarm will be securely clamped at all times while at rest, and to this end a pair of clamping bolts 138 and 139 are provided at opposite ends of the column as shown in Figure 10. One of these bolts, such as 138, is shown in detail in Figure 11 and has a threaded end 140 by which it is connected to a flexible portion 141 of the over-arm guideway for drawing the same towards the fixed portion 142 of the other half of the guideway. The clamping action is effected by a member 143 which is rotatable on a sleeve 144 and has a double right hand thread 145 cut on the periphery thereof for engagement with a fixed nut 146. The sleeve has a shoulder 147 which receives the thrust of member 143 as the same is rotated and transmits this thrust through a nut 148 to the clamping bolt 138. The sleeve 144 is held against rotation with respect to the bolt 138 by a pin 149 so that rotation of the member 143 will not tend to impart rotation to the nut 148 as the latter is utilized to determine the amount of clamping pressure which will be exerted upon predetermined rotation of the member 143.

The clamping bolt 139 has a similar construction on the end thereof except that the rotatable member 150 has a left hand double thread cut on the periphery thereof. The member 143 is connected by a tooth and slot connection 151 to a piston rod 152 which has a piston 153 secured to the end thereof and slides in a clamping cylinder 154. Similarly, the arm 150 is connected by a tooth and slot connection 155 to the end of a piston rod 156 having an integral piston 157 slidable in the clamping cylinder 158. As shown in Figure 10, the two clamping cylinders are mounted end to end and secured to the side of the column to prevent movement thereof.

A common supply pipe 159 is connected intermediate the ends of the two cylinders for supplying pressure simultaneously to one end of each cylinder to effect the clamping action and the extreme ends of the cylinders are connected by ports 160 and 161 respectively to a common channel 162 drilled in the cylinder casting and having connected thereto the pipe 163 which is alternately connectible to pressure or reservoir depending upon the action desired. In other words, the pipe 159 is placed under pressure and the pipe 163 connected to reservoir to effect actuation of the clamps and the pipe 163 is connected to pressure and the pipe 159 to reservoir to effect release of the clamps.

Figure 9:
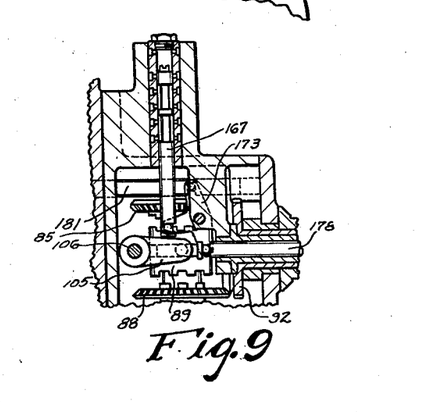
Figure 9 is a detail view showing the connections to the reverse valve as viewed on the line 9—9 of Figure 6.
Figure 12:
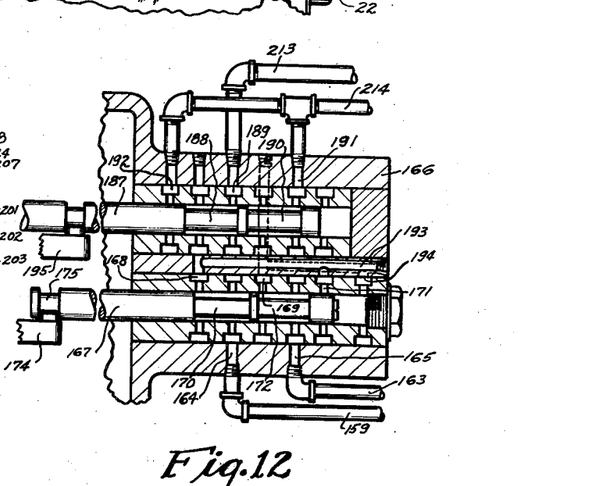
Figure 12 is an enlarged view showing the hydraulic connections to the interlock and reverse valves.

The pipes 159 and 163 are connected as shown in Figure 12 to ports 164 and 165 of the valve block 166. A reversing valve plunger 167 is slidably mounted in the valve block and has a first position such as that shown by which port 164 is connected to port 168 and port 165 connected to port 169. Upon movement of the plunger 167 toward the right, the port 164 will be disconnected from port 168 and connected to port 169 by the cannelure 170; and the port 165 will be disconnected from port 169 and connected to port 171 by the cannelure 172. The reversing valve plunger 167 is operatively connected with hand wheels 97 and 99 so that upon movement of either hand wheel into engagement with its respective clutch it will be shifted to the right of its position shown in Figure 12. In other words, whenever it is possible to axially shift either hand wheel the port 168 will be a pressure port and the port 169 will be an exhaust port so that while the hand wheels are out of engagement pressure will be connected to pipe 159, and the over-arm will be clamped; but upon movement of either hand wheel into an operating position the port 164 will be connected to the exhaust port 169 and the port 165 will be connected to the pressure port 171. The means for accomplishing this comprise a pivoted bell crank 173 which has one arm 174 connected by a pin and slot connection 175 to the plunger 167; a second arm 176 connected by a pin and slot connection 177 to rod 178; and a third arm 179 connected by a pin and slot connection 180 to rod 181. The crank 173 is so positioned that the rod 178 connected thereto extends axially through the sleeve 98 as shown in Figure 6 and is connected by the headed screw 182 to the hand wheel 97. The rod 181 extends crosswise of the column as shown in Figures 6 and 9 and is operatively connected by the fork 183 to groove 184 of a rod 185 which is connected to the hand wheel 99 by the headed screw 186. It will now be seen from an examination of Figure 13 that upon movement of rod 178 to the left or movement of rod 181 to the right that the valve plunger 167 will be shifted to the right as viewed in Figure 12, and upon movement of these two rods in opposite directions respectively that the plunger 167 will be positioned as shown in Figure 12. Thus the overarm is unclamped at any time that the manually operable hand wheels are moved to an operating position.

Means have also been provided that when any one of the power control levers 107, 112, or 124 are moved to effect movement of clutch 89 to either of its power transmitting positions that the over-arm will also be unclamped, and furthermore that while this clutch is in either of its power transmitting positions that the reversing valve plunger 167 and thereby the hand wheels 97 and 99 will be prevented from being moved so that either hand wheel cannot be accidentally engaged during power operation of the over-arm. This is accomplished by providing an interlock plunger 187 which is slidably mounted in the valve block 166 between the plunger 167 and the pressure and reservoir connections. In other words, the plunger 187 has a normal position such as that shown in Figure 12, at which time the clutch 89 is in a neutral position and at which time the cannelure 188 in the plunger connects the pressure port 189 to port 168 and the cannelure 190 connects the exhaust port 191 to port 169. Upon movement of any of the power control levers to shift the clutch to either one of its power transmitting positions, the plunger 187 is shifted to the left of the position shown in Figure 12 and to such an extent that the exhaust port 192 is inter-connected with port 168 and the pressure port 189 is inter-connected to port 169. It will be noted that the effect of this is to reverse the connections to pipes 159 and 163 so as to effect release of the overarm clamping mechanism. In addition, the port 169 is connected by the dotted line channel 193 to a port 194 which thereby admits pressure to the right hand end of plunger 167 to hold the same against inward movement during the time that the clutch 89 is in a power transmitting position. The valve plunger 187 thus serves as a reversing valve for the power control plunger to effect unclamping of the over-arm during power movement thereof and also acts as an interlock valve to prevent operation of the manual operating means for the over-arm during power movement thereof.

Figure 8:
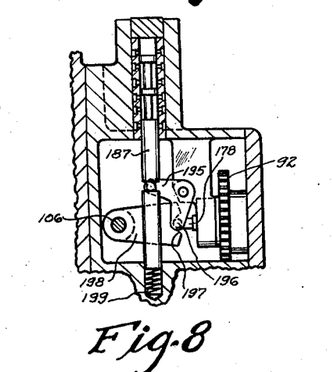
Figure 8 is a detail view showing the connections to the interlock valve as viewed on the line 8—8 of Figure 6.

The plunger 187 has a bell crank 195 connected thereto as shown in Figure 8, the other arm of the bell crank having a pin 196 which normally rides in an indent formed in the end of lever 198 keyed to shaft 106. Upon rotation of shaft 106, however, in either a clockwise or counter-clockwise direction the bell crank 195 will be rotated in a counter-clockwise direction to effect unidirectional movement of plunger 187 for either direction of rotation of shaft 106. A spring 199 acting on the end of plunger 187 serves to maintain the pin 196 in pressure engagement with the end of arm 198.

It will also be noted that since the trip lever 125 is secured to shaft 106 that whenever the trip lever is actuated by the dogs to move the clutch 89 to its neutral position, that the over-arm is also clamped. Thus the trip lever serves the dual function of stopping the movement of the over-arm and simultaneously clamping the same.

Figure 11:
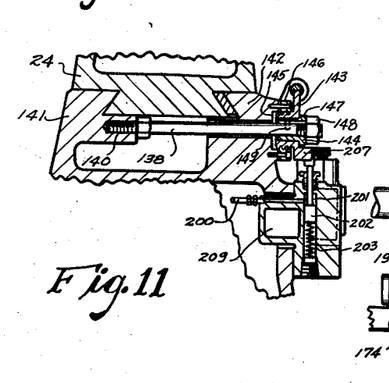
Figure 11 is a detail view of the automatic lubricating mechanism as viewed on line 11—11 of Figure 10.

Since the over-arm is only moved at irregular intervals, it is not necessary to maintain continuous lubrication thereof, and therefore means have been provided whereby the over-arm is only lubricated when the same is to be moved. To this end, as shown in Figure 11, a lubricant pipe 200 is provided for supplying lubricant to the over-arm guideways and is connected to a cylinder 201 having a reciprocable plunger 202 mounted therein which is acted upon at one end by a spring 203. The plunger 202 has a valve 204 in the center thereof whereby upon downward movement of the plunger the lubricant is forced by the plunger 202 to the upper end of the cylinder and upon release of the downward pressure, the spring 203 gradually forces the entrapped lubricant through pipe 200 to gradually lubricate the over-arm guideways. The plunger 202 moves downward by a lever 205 which has a projecting end 206 adapted to be engaged by a lug 207 fixed with the rotatable member 143 whereby upon rotation of said member to unclamp the over-arm the plunger 202 will be released to effect lubrication and upon rotation of the member to a clamping position the plunger 202 will be depressed so that the same will be preloaded for the next release of the clamping mechanism.

The lower end of the cylinder containing plunger 202 may be supplied through a channel 208 from a small lubricant reservoir 209 mounted on the side of the machine.

The pressure for supplying the clamping mechanism may be obtained from a pump 210 operatively connected to the shaft 32 as shown in Figure 13, having an intake pipe 211 through which oil is withdrawn through a suitable reservoir 212 formed in a column on the machine and delivered under pressure to channel 213 which is connected to port 189 as shown in Figure 12. Ports 191 and 192 may be connected to a common return line 214 through which the fluid is returned to reservoir 212.

Power movement of the over-arm makes it possible to utilize the same for effecting relative movement between the cutter and work in a different way and by attaching a cutter spindle to the end of the over-arm a machine simulating a vertical type milling machine may be obtained. The latter effect may be produced by mounting an attachment 215 carrying a cutter spindle 216 to the end of the over-arm. This attachment may comprise an angular bracket 217 in which is formed guideways 218 similar in cross section to the guideway formed on the under side of the over-arm so that the same may be readily mounted and secured thereto. This bracket not only serves to support the attachment such as 215 but also the driving mechanism for the spindle 216.

Figures 2, 3:
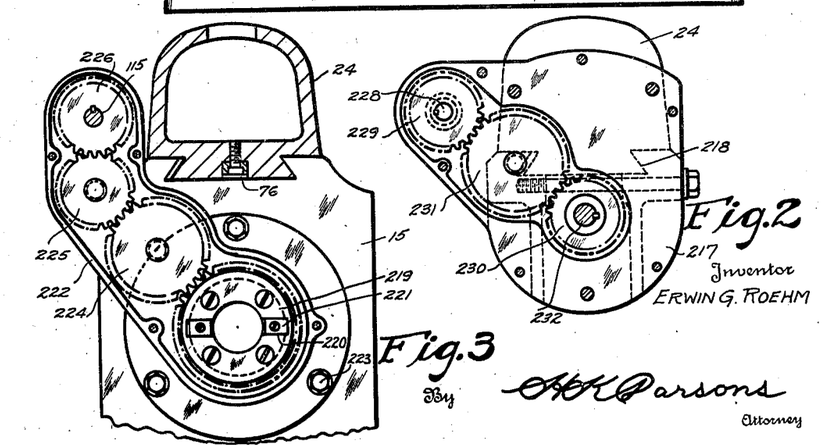
Figure 2 is a section on the line 2—2 of Figure 1.
Figure 3 is a section on the line 3—3 of Figure 1.

This spindle may be driven from the main spindle of the machine by applying a gear 219 to the nose of the regular spindle 22, the gear having a pair of radial slots 220 which operatively engage the arbor driving keys 221. A bracket 222 is secured to the face of the column as by bolts 223 for supporting a gear train comprising a gear 224 which meshes with gear 219 and in turn rotates through the idler 225 a gear 226 which has an elongated hub 227 by which it is rotatably supported by the bracket and also held against longitudinal movement. This gear has a splined bore in which slides the spline drive shaft 228 which is of sufficient length to extend to the forward end of the over-arm and into the bracket 217. The shaft is fixed for movement with the bracket 217 and has a gear 229 fixed to the end thereof which, as shown in Figure 2, drives a gear 230 through an intermediate idler 231.

The gear 230 is keyed to a shaft 232 which extends through the rear wall 233 of the attachment 215 for receiving a bevel gear 234. This gear drives the spindle 216 through a bevel gear 235. The attachment 215 is rotatable about the axis of shaft 232 for adjusting a cutter spindle 216 at an angle to the work table when so desired, and is secured in these angular positions by a clamping block 236. Since the drive between the spindle 22 and the spindle 216 is a one to one drive, the spindle 216 may be rotated through the same range of speeds that the spindle 22 is capable of. It will now be noted that the cutter spindle 216 may be rotated from the prime mover 25 and the control of the starting clutch 64 and may be moved relative to the work table through the feed transmission 38 or the rapid traverse transmission, and the feed movement or quick traverse movement may be automatically controlled by the trip mechanism previously explained.

The attachment 215 is shown as illustrating one form of attachment which may be applied to the angular bracket 217, it being evident that other forms may be utilized in this connection if it is desirable the spindle 216 being capable of additional movement, an attachment such as shown in United States Patent 1,976,107 issued October 9, 1934 may be substituted for the one shown.

There has thus been shown a milling machine in which relative movement between the cutter and the spindle may be accomplished in other than conventional ways, and one which may be utilized as either a vertical or horizontal milling machine, and in which when utilized as a vertical machine that power movement may be effected between the tool and work without heavy supports; and when utilized as a horizontal machine in a conventional manner that the over-arm may be easily and readily adjusted from a plurality of stations and by either manual or power means, and that in any case the over-arm of this machine is rigidly clamped at all times when not being moved and is automatically lubricated to facilitate its movement at any time that it is found necessary to do so.

What is claimed is:

1. In a milling machine having a column, a reciprocable work support carried by the column and a cutter spindle rotatably supported by the column in operative relation to the work support, the combination with an over-arm carried by the column and adjustable in a direction parallel to the axis of said cutter spindle for supporting the outboard end of a cutter arbor driven by said spindle, of power means for effecting said adjustment including a drive shaft, means for rotating said shaft selectively at relatively slow rates or at a relatively fast rate, and means to control the connection of said shaft for actuation of the over-arm including a control lever pivotally mounted on the end of said over-arm.

2. In a milling machine having a column, a reciprocable work table supported by said column, a tool spindle journaled in the column, an over-arm slidably mounted in the column in a direction parallel to the axis of said cutter spindle, means for effecting relative movement between the work support and tool spindle including a feed transmission, a rapid traverse transmission, a clutch for selectively connecting the transmissions for effecting said movement at relatively slow or feeding rates, or at a quick traverse rate, a gear box attached to the side of the column having a power in-put member driven by said transmissions inclusive of said clutch, and means in said gear box for selectively connecting said member for reversible operation of said over-arm.

3. In a milling machine having a column, a reciprocable work table supported by said column, a tool spindle journaled in the column, an over-arm slidably mounted in the column in a direction parallel to the axis of said cutter spindle, means for effecting relative movement between the work support and tool spindle including a feed transmission, a rapid traverse transmission, a clutch for selectively connecting the transmissions for effecting said movement at relatively slow or feeding rates, or at a quick traverse rate, a gear box attached to the side of the column having a power in-put member driven by said transmissions inclusive of said clutch, a reversing clutch in said box for operatively connecting said member to the over-arm for movement thereby, and a plurality of control levers located at different operating stations of the machine for determining the position of said reversing clutch.

4. In a milling machine having a column, a reciprocable work table supported by said column, a tool spindle journaled in the column, an over-arm slidably mounted in the column in a direction parallel to the axis of said cutter spindle, means for effecting relative movement between the work support and tool spindle including a feed transmission, a rapid traverse transmission, a clutch for selectively connecting the transmissions for effecting said movement at relatively slow or feeding rates, or at a quick traverse rate, a gear box attached to the side of the column having a power in-put member driven by said transmissions inclusive of said clutch, a reversing clutch in said box for operatively connecting said member to the over-arm for movement thereby, a plurality of control levers located at different operating stations of the machine for determining the position of said reversing clutch, said clutch having a neutral position, and a plurality of manually operable means selectively connectible for movement of said over-arm when the reversing clutch is in a neutral position.

5. In a milling machine having a tool spindle and a work support and power operable means for effecting relative movement therebetween, the combination of an over-arm adjustable in a direction parallel to the axis of said tool spindle and adapted to support the outboard end of a tool arbor driven by said spindle, a branch train driven by said power operable means and selectively connectible for power moving said over-arm, a power operable clamp for said over-arm, and means to automatically operate said clamp upon disconnection of the power means from the over-arm.

6. In a milling machine having a power movable over-arm and a plurality of controls for determining said power movement, the combination of hydraulic means for clamping said overarm including a control valve, and means operatively connecting said valve to all of said controls whereby upon movement of any control to cause power movement of the over-arm the clamping means will be automatically released.

7. In a milling machine the combination with an adjustable over-arm of power operable means for moving said over-arm including a plurality of control levers, a plurality of manually operable means selectively connectible for movement of the over-arm, hydraulic means for clamping the over-arm including a valve mechanism, means operatively connecting said power control means and said manually operable means to said mechanism for operation thereof to release said hydraulic clamping means whenever the over-arm is caused to move by any of said controls.

8. In a milling machine having a cutter spindle and an over-arm movable in a direction parallel to the axis of said spindle, the combination of power operable means including a control therefor for determining power movement of the over-arm, manually operable means selectively connectible for moving said over-arm, and an hydraulic interlock to prevent connection of said manual means for operation of said over-arm when said control is positioned for power operation of said over-arm.

9. In a milling machine having a movable support, the combination of power operable means for clamping said support in a fixed position, power operable means for moving said support including a trip control mechanism for stopping movement of the support, and means operatively connected to said mechanism for automatically effecting clamping of the support when the support is stopped.

10. In a machine tool having a movable support, the combination with guideways therefor of a power operable means for clamping and unclamping said support with respect to its guideways, lubrication applicating means for the guideways, and automatic actuating means therefor automatically effective upon release of said clamping means.

11. In a machine tool having a fixed support and a slide movable in guideways carried by said support, the combination of power operable means for clamping and unclamping the slide to said support, a movable plunger for applying lubrication to said guideways, power operable means for moving said support including a control clutch; and a single control lever for simultaneously shifting said clutch releasing means, said clamping means and operating said plunger whereby the support may be unclamped, power moved, and lubrication applied to its guideways in a single movement of said lever.

12. In a machine tool having a support, a slide movable in guideways on said support, the combination of a plurality of manually operable control members movable to cause movement of the support, a shiftable member for applying a shot of lubrication to said guideways, and means operatively connecting said plunger to said controls whereby said guideways will be automatically lubricated every time the slide starts to move.

13. In a machine tool having a support, guideways formed upon said support, and a slide movable in said guideways, the combination of means for clamping said support against movement with respect to said guideways, a shiftable member for applying a shot of lubrication to said guideways, a manually operable control member, said member being movable in a first direction to effect release of said clamping means and actuation of said shiftable means for lubricating said guideways, and in a second direction for manually traversing said slide.

14. In a machine tool having a work support and a tool support, the combination with a power transmission for effecting relative movement between the supports, of a plurality of manually operable levers located at spaced points, said levers being shiftable to operatively connect them for manually effecting relative movement between the slides, fluid operable means for clamping the moving slide, a source of pressure, a valve plunger for connecting and disconnecting said source of pressure to said clamping means, and means operatively connecting said manually operable means to said valve plunger for simultaneously shifting the same to a clamp disengaging position upon movement to an operative position to effect said relative movement.

15. In a machine tool having a work support and a tool support, the combination with a power transmission for effecting relative movement between the supports, of a plurality of manually operable levers located at spaced points, said levers being shiftable to operatively connect them for manually effecting relative movement between the slides, fluid operable means for clamping the moving slide, a source of pressure, a valve plunger for connecting and disconnecting said source of pressure to said clamping means, means operatively connecting said manually operable means to said valve plunger for simultaneously shifting the same to a clamp disengaging position upon movement to an operative position to effect said relative movement, and fluid operable means for shifting said valve plunger to a clamp engaging position upon connection of said power transmission to effect said relative movement.

16. In a machine tool having a work support and a tool support, the combination with a power transmission for effecting relative movement between the supports, of a plurality of manually operable levers located at spaced points, said levers being shiftable to operatively connect them for manually effecting relative movement between the slides, fluid operable means for clamping the moving slide, a source of pressure, a valve plunger for connecting and disconnecting said source of pressure to said clamping means, means operatively connecting said manually operable means to said valve plunger for simultaneously shifting the same to a clamp disengaging position upon movement to an operative position to effect said relative movement, and fluid operable means for shifting said valve plunger to a clamp engaging position upon connection of said power transmission to effect said relative movement, said last named means including a second valve plunger simultaneously operable with connection of said power means to couple the source of pressure to said fluid operable means.

ERWIN G. ROEHM.